H. A. MORISON.

INSURANCE REFERENCE SHEET.

APPLICATION FILED MAY 9, 1916.

Reissued June 20, 1916. 14,154.

*Fig. 3.*

K''

— OFFICIAL RATES —

BLOCK 631 BELLINGHAM, WN.

Bounded by 1st & 2nd - Harris & Mills Aves.

| No. of Rating | LOCATION | MAP No. | CLASS | OCCUPATION | BLDG | CONT. | V |
|---|---|---|---|---|---|---|---|
| 1 | HARRIS AV | 101 | D | Saloon | 7.00 | 7.00 | |
| 2 | | 101½ | D | Vacant (2) | 7.00 | 7.00 | |
| 3 | | 105 | D | Various | 7.00 | 7.00 | |
| 4 | | 107 | D | Tobaccos | 7.00 | 7.00 | |
| 5 | | 109 | D | Vacant St. | 7.00 | 7.00 | |
| 6 | | 109½ | D | Boots & S | 7.00 | 7.00 | |
| 7 | | 111 | D | Candy | 7.00 | 7.00 | |
| 8 | | 111½ | D | Barber | 7.00 | 7.00 | |
| 9 | | 113 | D | Drugs | 7.00 | 7.00 | |
| 10 | | 115 | D | " | | | |
| 11 | SECOND | 208 | B | 3 Story Brick | 1.99 | 2.09 | |
| 12 | | 210 | B | " | 1.99 | 2.09 | |
| 13 | | 206 | B | 1 Story Brick | 1.75 | 1.80 | |
| 14 | | 204 | B | (Dry Goods) | " | 1.90 | |
| 15 | | 202 | D | Various | 3.50 | 3.50 | |
| 16 | Rear | 202½ | D | Stable | 3.00 | 3.00 | |
| 17 | | 200 | D | Vacant | 3.50 | 3.50 | |
| 18 | | | | | | | |
| 19 | MILL AV. | | | | | | |
| 20 | | | | | | | |
| 21 | | | | | | | |
| 22 | | | | | | | |
| 23 | FIRST | | | | | | |
| 24 | | | | | | | |
| 25 | | | | | | | |

L M N O P R S T

*Fig. 2.*

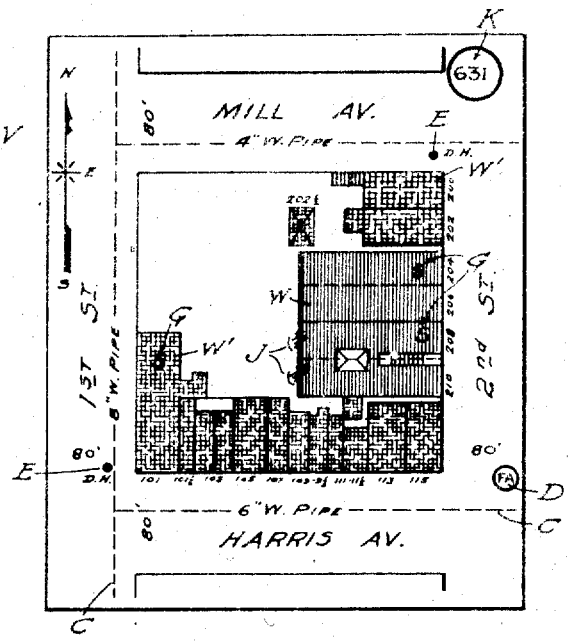

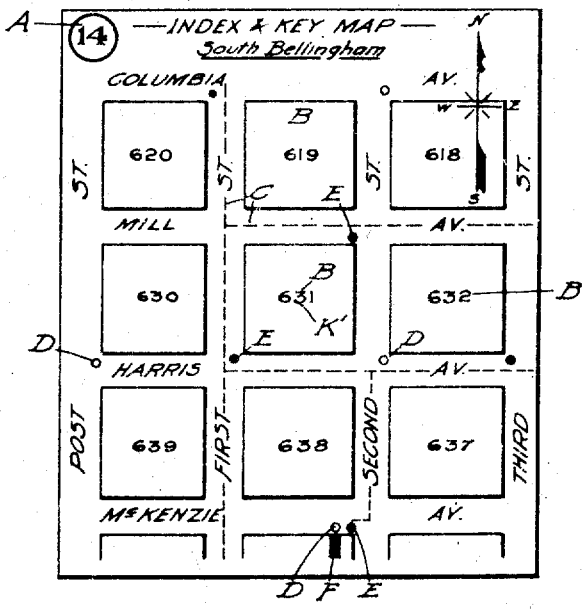

*Fig. 1.*

WITNESSES:

A. B. Cornelius

Horace Barnes

INVENTOR

Henry A. Morison

BY

Pierre Barnes

ATTORNEY

UNITED STATES PATENT OFFICE.

HENRY A. MORISON, OF SPOKANE, WASHINGTON.

INSURANCE REFERENCE-SHEET.

14,154. Specification of Reissued Letters Patent. Reissued June 20, 1916.

Original No. 1,090,789, dated March 17, 1914, Serial No. 547,935. Application for reissue filed May 9, 1916. Serial No. 96,363.

*To all whom it may concern:*

Be it known that I, HENRY A. MORISON, a citizen of the United States, residing at Spokane, in the county of Spokane and State of Washington, have invented certain new and useful Improvements in Insurance Reference-Sheets, of which the following is a specification.

This invention relates to an insurance reference sheet. At present such maps are commonly bound into large volumes, and the schedules of official or recommended rates applicable to the buildings and other risks indicated on the maps are placed upon detached cards or bound in book form. The finding of the rate of insurance upon a given risk, under the present practice, involves always a tedious series of references and frequently a page to page search. The preparation of the maps, moreover, by reason of the representation on each sheet of a relatively large area, requires great outlay for surveying, drafting and engraving.

The object of my invention is, primarily, to simplify and render more convenient the method of reference from insurance maps to rate schedules and, incidentally, to lessen the cost of the preparation and publication of insurance maps.

With this end in view, my invention consists in providing (1) a series of cards of convenient size, each bearing a map of a small portion (*e. g.*, a city block) of the entire area to be represented by a series, together with the schedule of rates applicable to the buildings and other risks delineated on the map; and (2) a key map, on a small scale, of the entire area represented on the series of cards. On the key map the blocks or other subdivisions separately mapped on the cards are to be consecutively numbered and each card is to bear the key map number of the block or other portion thereon represented.

In the drawings illustrating an embodiment of my invention, Figure 1 is a plan view of a section of a key map; Fig. 2 is a plan view of a diagram map of a subdivision of that shown in Fig. 1, including all descriptive matter usually contained in insurance maps; and Fig. 3 is a similar view of a rate schedule shown in tabulated form. It is to be understood that these three sheets may either be separate sheets of paper having the proper characters and indications thereon or the rate sheet may be printed upon the back of either of the other sheets or the sheets combined in any similar way.

The key map, a section of which is shown in Fig. 1, may cover the entire city or other district mapped upon the cards; or if more practicable it may be represented on several sheets, in which case each sheet should bear an index character, indicated by A in Fig. 1. This key map has designated thereon the various city blocks, which are indicated by suitable numbers B, as are also the streets by their several names. The key map may also indicate water mains, as by broken lines C in the view; and by representative marks, as D, E and F, respectively, the location of fire alarm stations, water hydrants and fire engine houses which are included within the scope of the map; and it may include such other features as the convenience of the underwriters may require.

The diagram map illustrated in Fig. 2 comprises but a small portion of the area shown on the key map, preferably a single city block. It indicates the location, size and relative position of the several buildings and other structures within the area represented, and there is also indicated thereon supplemental details as to height, structural materials and other characteristics of the buildings;—in short, containing all of the information which may be conveniently delineated upon a detail diagram map. It also affords information as to the street numbers of the several buildings represented, indicates the widths of streets, alleys and other open spaces within and surrounding the area included in the map; as well as having designated upon the represented buildings symbols to indicate such protective devices as automatic sprinklers G, iron shutters J, etc.

The above described diagram map or the card bearing the same is given an index letter or number K, corresponding to a designating character, as $K^1$, upon the key map. The rate sheet, Fig. 3, is similarly marked by a designating letter or number, as $K^{11}$, and is ruled by vertical and horizontal lines to provide respectively columns and rows for a systematic arrangement of the several factors and whereby reference thereto for information is facilitated. More particularly, the first column L is utilized for a series of numbers selected by the rating officer to designate the segregable properties which are included in the companion diagram map, Fig. 2, and which are or may be subject to insurance. In the next column, M, is desirably placed the names of the streets upon which such properties abut; and in the next column, N, is contained the street numbers of the respective properties; and in the following column, O, is designated by denominating characters the class of risks to which each particular piece of property is assigned by statute or otherwise. The next column, P, is employed to indicate the various occupations which are being conducted in the several enumerated places, and may also be used for indicating other information pertaining to the structure of the several buildings, their contents, etc. The next two columns, R and S, have the official or recommended rates of insurance upon the several buildings and their contents expressed in figures. Still another column T, may be provided for the insertion of any memoranda relating to the several buildings, etc. Each of the aforesaid columns is properly designated as shown in the row V.

In practice, the diagram map and the rate sheet shown in Figs. 2 and 3 respectively, are advantageously made upon opposite sides of a card so that they will be inseparable; or they may be placed upon the opposite inside pages of a folded card. When not in use, the cards are readily filed away in their alphabetical or numerical order in a card index box. Furthermore, by thus combining the rate sheet with the diagram map both may be more conveniently utilized by an insurance agent or by an inspector when making a survey of the subdivision included within the scope of the map.

The operation of the invention may be explained as follows: Reference to the key map (Fig. 1) discloses the index number of the particular block wherein a given risk is located, by which number the proper card, including the diagram map and the rate sheet thereto applicable, is readily found from the file. An inspection of this card furnishes all the data required in ascertaining or fixing the rate of insurance upon a given risk, as will be readily understood from the foregoing description.

What I claim as my invention, is—

1. In a card index, the combination with a key map, of a series of maps, the series of maps being sub-divisions of the aforesaid key map, each section of the key map having a number corresponding to a number on the sub-division maps, each sub-division map having conventional means thereon to indicate respectively a certain area, the relative positions of structures within said area, the material of which said structures are built, fire protective devices, the opposite sides of each map constituting a rate sheet having means to constitute a heading and appropriately numeral designated spaces below said heading for entry respectively of indications of the structures within said area subjected to insurance, the names of the streets upon which the structures abut, street numbers of the represented structures, class of the risk, occupations conducted in the enumerated structures, and rates of insurance on the building and its contents.

2. In a card index, the combination with a key map, of a series of maps, the series of maps being sub-divisions of the aforesaid key map, each section of the key map having a number corresponding to a number on the sub-division maps, each sub-division having conventional means thereon to indicate respectively a certain area, the relative positions of structures within said area, the material of which said structures are built, fire protective devices, and a rate sheet having means to constitute a heading and appropriately numeral designated spaces below said heading for entry respectively of indications of the structures within said area subjected to insurance, the names of the streets upon which the structures abut, street numbers of the represented structures, class of the risk, occupations conducted in the enumerated structures, and rates of insurance on the building and its contents.

Signed at Seattle, Washington, this 31st day of March, 1916.

HENRY A. MORISON.